United States Patent Office 3,166,542
Patented Jan. 19, 1965

3,166,542
SURFACE TREATED INORGANIC SOLID POLYMERIZATION CATALYST AND METHOD OF POLYMERIZATION THEREWITH
Adam Orzechowski, Brookline, and James C. MacKenzie, Wellesley Hills, Mass., assignors to Cabot Corporation, Boston, Mass., a corporation of Delaware
No Drawing. Original application Apr. 11, 1960, Ser. No. 21,110. Divided and this application Feb. 3, 1961, Ser. No. 86,868
25 Claims. (Cl. 260—93.7)

This invention relates to the polymerization and copolymerization of monoolefins and diolefins such as ethylene, propylene, butene-1, styrene, isoprene and butadiene and includes within its scope improved catalysts for such polymerization reactions.

This application is a division of U.S. patent application, Serial No. 21,110, filed on April 11, 1960, which application was in turn a continuation-in-part of U.S. patent application Serial No. 2,861, filed January 18, 1960, now abandoned.

Accordingly, it is a principal object of the present invention to provide a novel process for polymerizing mono- and diolefins and mixtures thereof.

Other objects of the present invention will in part be obvious and will in part appear hereinafter.

In accordance with the present invention, mono- and diolefins, preferably those containing not over 8 carbon atoms, are polymerized or copolymerized by catalysts comprising (a) the product of the reaction carried out under certain conditions between a halide-type compound of a group IVa, Va or VIa metal and a finely divided particulate inorganic solid having surface hydroxyl groups thereon, and (b) an organometallic compound. The polymerization or copolymerization reaction can be effected at suitable temperatures within the range of from about −25° C. to about 250° C., and pressures ranging from below atmospheric upwardly to any desired maximum pressure, for example, 30,000 p.s.i.g. or even higher pressures.

Inorganic solids suitable for the purposes of the present invention generally include any inorganic compound which is available in finely divided particulate form with hydroxyl groups on the surface thereof. For example, oxides such as alumina, titania, zirconia, silica, thoria and magnesia, silicates such as chrysotile, actinolite and crocidolite, and aluminates such as corundum and bauxite are all generally suitable for the purposes of the present invention.

Halide-type compounds of group IVa, Va and VIa metals (hereinafter generally referred to as transition metal halides) suitable for the purposes of the present invention are the compounds conforming to the general empirical formula:

$$TO_aX_b$$

wherein T is a metal of groups IVa, Va or VIa (where the group numbers correspond to the Mendeleev Periodic System), O is oxygen, $a$ equals 0, 1 or 2, each X is a halogen, and $b$ is an integer from 1 to 6.

Examples of suitable compounds conforming to the general formula are halides of group IVa, Va and VIa metals such as titanium tetrachloride, zirconium tetrachloride, vanadium tetrachloride, chromium trichloride, tungsten hexachloride and titanium tetraiodide, and oxyhalides of group IVa, Va and VIa metals, such as vanadium oxychloride.

The conditions under which reaction between the transition metal halide and the finely divided inorganic solid can be accomplished are subject to considerable variation. However, in order to obtain a catalyst component with exceptionally high activity and reproducible character and performance, three relatively simple refinements have been found to be all important, namely (1) the finely divided inorganic solid should be essentially dry and anhydrous (i.e. free of molecular water in any form) at the time it is brought into contact with the transition metal halide, (2) special provision should be made to withdraw gaseous by-products of the reaction (for example, HCl) from the reaction mixture and (3) the reaction between the finely divided inorganic solid and the transition metal halide must occur at temperatures below about 105° C. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture and the rate of removal of the gaseous by-products. Generally speaking, any temperature between about 0° C. and 105° C. can be used satisfactorily, but room temperature or higher will generally be used. Assuming provision is made for intimate contact of the dry inorganic solid and the transition metal halide and for active withdrawal of gaseous by-products, such as HCl, the time required to accomplish the chemical reaction needed will vary from periods of the order of hours (i.e. from about 0.5 hours to about 20 hours) at room temperature to periods of the order of minutes (i.e. from about 0.5 to about 20 minutes) at temperatures of about 105° C. Temperatures substantially higher than about 105° C., e.g. 200° C., are completely needless and therefore of little or no interest, although as disclosed in application Serial No. 2,861, temperatures as high as about 300° C. or higher can be utilized if desired. Moreover, temperatures above about 105° C. should be avoided because the catalyst components produced at temperatures below about 105° C. are, as explained more fully hereinafter, superior to catalyst components produced at higher temperatures.

Although use of the transition metal halide in liquid or solution form gives excellent results, a particularly uniform reaction of the said metal halide with the inorganic solid can be effected if the latter is exposed to vapors of said metal halide at a temperature of from about 20° C. to about 105° C. from a few minutes to about 1 hour or more depending upon the temperature and the rate of removal of the gaseous by-products. Said vapors can be supplied under their own vapor pressure using a partial vacuum if necessary, or with the aid of a dry inert carrier gas such as nitrogen. This vapor phase treatment can be accomplished in any suitable manner such as by circulating the vapors through the particulate solid in a fixed, moving or fluidized bed reactor.

Removal of the gaseous by-products of the reaction can be accomplished in many ways such as (a) by accomplishing the reaction under vacuum, (b) sweeping the reaction vessel with an inert gas such as (dry, oxygen-free) nitrogen, (c) by carrying out the reaction at sufficiently elevated temperatures while stirring to drive off the gaseous by-products (d) by carrying out the reaction in a refluxing solvent and (e) by any combination of these.

The accomplishment of an actual chemical reaction of controlled extent between the finely divided inorganic solid and the transition metal halide is of utmost importance in obtaining the exceptional active and efficient catalyst components described in this invention, e.g. the grams of polymer producible per gram of catalyst employed is generally highly dependent upon both the amount of transition metal chemically combined with a given amount of the said inorganic solid and the manner in which it is chemically combined therewith. These, in turn, are dependent largely on two main factors, each of which is separately controllable to a large extent. The first factor in question is the molar quantity of hydroxyl groups available on the surface of the inorganic solid per weight of said solid. For a given inorganic solid, for example, this first factor is largely a matter of (a) the fineness of subdivision of the form in which said solid is available and (b) the chemical nature of the surface of said solid, the upper limit clearly being reached when the solid is ultra fine and the surface thereof is stoichiometrically saturated with hydroxyl groups. The second factor in question is the proportion of the said surface hydroxyl groups which are actually chemically reacted with the transition metal halide with resultant loss of HCl and formation of chemical linkages of the transition metal to the solid and the number of such chemical linkages established with each transition metal atom. For a given pair of reactants, i.e. solid+transition metal halide, this second factor will be largely determined by reaction conditions and principally by the reaction temperature used.

In view of the above discussion it is clear that in preparing the surface reacted inorganic solids of the present invention, the smaller the average particle size of the inorganic solid and the larger the quantity of hydroxyl groups on the surface thereof, the greater will be the potential activity and efficiency of the resulting catalyst component producible therefrom. Accordingly, it is important to use as the starting material particulate finely divided inorganic solids having an average equivalent particle diameter of less than about 1 micron and preferably less than about 0.1 micron and which have a substantial hydroxyl group content on the surface thereof. Accordingly, pyrogenic metal or metalloid oxides, i.e. oxides produced by the vapor phase oxidation or hydrolysis of a corresponding metal compound are greatly preferred.

In short, to reduce this discussion of extent of reaction between the inorganic solid and the transition metal halide to the simplest possible terms, it is believed that the surface reacted inorganic solid can best be described and specified as follows: Preferred for imparting optimum catalytic activity and providing maximum catalyst efficiencies when used with a given organometallic compound in a given system are those inorganic solids which have from between about $1 \times 10^{-4}$ and about $5 \times 10^{-3}$ gram atoms of the transition metal chemically attached to the surface thereof per gram of said solid. Still quite useful and practical, however, particularly when for other reasons amounts of 1 part or more by weight of the inorganic solid per 100 parts of the polymer product are desired, are those surface reacted inorganic solids which contain as little as $1 \times 10^{-5}$ gram atoms of transition metal chemically combined to the surface thereof per gram of said inorganic solid. Although the mechanism of the reaction between the transition metal compound and the inorganic solid is not completely understood, it is known that the transition metal compound reacts with the hydroxyl groups on the surface of the inorganic solid liberating gaseous by-products such as HCl, which must be withdrawn from the reaction zone in order for the reaction to proceed to completion. It is believed, but there is no intention to be bound by this explanation, that the type of reaction that occurs is correctly illustrated by the following illustrative equation, wherein silicon dioxide serves as the inorganic solid and tungsten hexachloride serves as the transition metal compound.

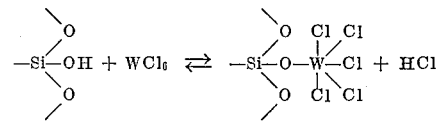

If the precaution of using a substantially anhydrous inorganic solid and/or removing the gaseous by-products such as HCl, are not observed, then the desired chemical reaction, such as that suggested by the above illustrative equation, either does not occur at all or does not predominate to the extent necessary to produce a superior active catalyst component. Instead products are obtained which are very inferior as catalyst components in that (a) enormously less polymer per gram of catalyst is produced and (b) reaction rates for production of polymer are enormously lower. Apparently, if the gaseous by-product, such as hydrogen chloride, are not removed, retardation and even reversal of the reaction occurs either preventing the formation of the desired product having high catalytic activity, or contaminating it with harmful or inactive components.

Equally important in obtaining the desired reaction product is the use of a dry inorganic solid in the above reaction. Therefore, if the said solid to be used contains molecular water in any form and/or tends to adsorb same on exposure to humid atmospheres, etc., it must be dried immediately before use or, after drying, must be maintained continuously out of contact with water or water vapor until used.

Also, it is pointed out that in order to obtain a catalyst component of the highest possible activity, aside from observing the above important precautions and reaction conditions, it is also recommended that the quantity of transition metal halide with which the inorganic solid is contacted be at least approximately sufficient to provide one atom of transition metal for each three hydroxyl groups on the surface of the inorganic solid, in order to react all of the active hydroxyl groups possible, since those left unreacted might otherwise deactivate a portion of the organometallic component of the catalyst which will be added subsequently.

Moreover, it is generally necessary to use somewhat more than this minimum amount of transition metal halide, and to restrict the reaction temperatures to less than 105° C. in order to favor the reactions typified by Equations 1 and 2 over those illustrated by Equations 4 and 5 which follow, because the products of Equations 1 and 2 are much more active as catalyst components than products such as those of Equations 4 and 5, which, relative to the quantity of transition metal present, have a smaller halogen content.

EQUATION 1

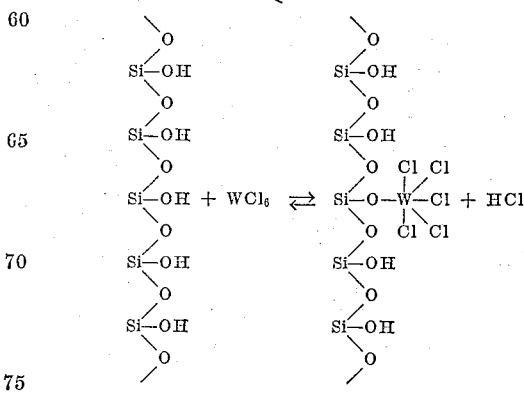

EQUATION 2

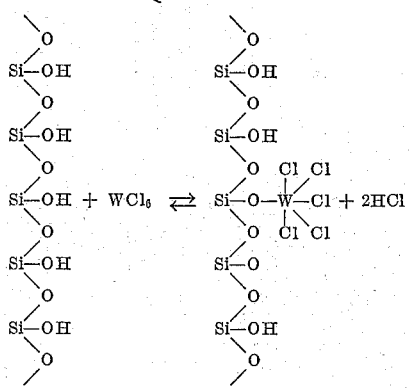

EQUATION 3

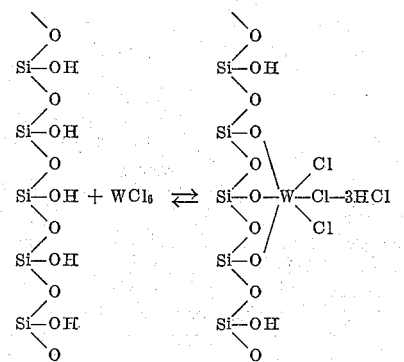

EQUATION 4

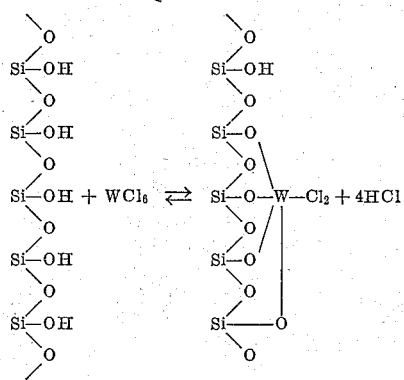

EQUATION 5

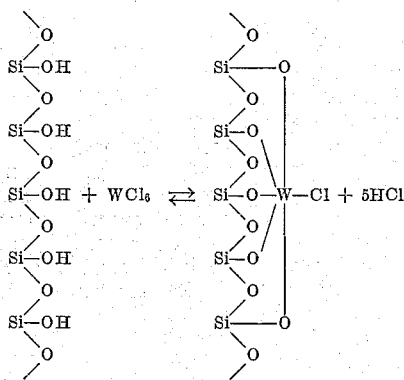

On the other hand, if more transition metal compound is introduced than will react under the reaction conditions used, the excess is preferably removed before formation of the polymerization catalyst. Although the excess can be removed by extraction, it is obviously more desirable to avoid additional steps.

Organometallic compounds suitable for the purposes of the present invention are any of the compounds conforming to the general formula:

$$MM'_v X_n R_y$$

wherein M is a metal chosen from groups I, II or III of the periodic table; M' is a metal of group I of the periodic table; $v$ equals 0 or 1; each X is a halogen; $n$ equals 0, 1, 2, or 3; each R is any monovalent hydrocarbon radical or hydrogen; and $y$ equals 1, 2, 3 or 4.

Compounds of a single group I, II or III metal which are suitable for the practice of the invention include compounds conforming to the subgeneric formula:

$$M(R)_k$$

wherein M is a group I, II or III metal, such as lithium, sodium, beryllium, barium, boron, aluminum, copper, zinc, cadmium, mercury, and gallium; wherein $k$ equals 1, 2 or 3 depending upon the valency of M which valency in turn depends upon the particular group (i.e. I, II or III) to which M belongs; and wherein each R may be any monovalent hydrocarbon radical. Examples of suitable R groups include an aryl or alkaryl radical, aliphatic hydrocarbon radical or derivative, such as alkyl, cycloalkylalkyl, cycloalkenylalkyl, arylalkyl, cycloalkyl, alkylcycloalkyl, arylcycloalkyl, cycloalkylalkenyl.

Specific examples of R groups for substitution in the above formula include methyl, ethyl, n-propyl, isobutyl, n-amyl, isoamyl, hexyl, n-octyl, n-dodecyl, and the like; 2-butenyl, 2-methyl-2-butenyl and the like; cyclopentylmethyl, cyclohexylethyl, cyclopentylethyl, methylcyclopentylethyl, 4-cyclohexenylethyl and the like; 2-phenylethyl, 2-phenylpropyl, α-naphthylethyl, methylnaphthylethyl, and the like; cyclophentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Generally preferred, however, are the organocompounds of groups I, II and III, such as methyl and butyllithium, pentenylsodium, dihexylmercury, diallylmagnesium, diethylcadmium, benzylpotassium, divinylmagnesium, di-p-tolylmercury, diethylzinc, tri-n-butylaluminum, methyl phenyl mercury, diisobutyl ethylboron, diethylcadmium, di-n-butylzinc and tri-n-amylboron, and in particular and the aluminum alkyls, such as trihexylaluminum, triethylaluminum, trimethylaluminum, and in particular triisobutylaluminum.

In addition, mono-organo-halides and hydrides of group II metals, and mono- or di-organo-halides and hydrides of group III metals conforming to the above general formula are also preferred. Specific examples of such compounds are diisobutylaluminum bromide, isobutylboron dichloride, methylmagnesium chloride, phenylmercuric iodide, ethylberyllium chloride, ethylcalcium bromide, hexylcupric chloride, diisobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride.

Also, compounds comprising a group I, II or III metal compound complexed with a group I metal compound if they conform to the above general formula, are generally suitable. Examples of such compounds are tetraethyllithium aluminum, tetrahexyllithium aluminum, trihexylpotassium aluminumchloride, triethyllithium aluminum bromide, tributylsodium zinc, tributyllithium zinc, trioctadecylpotassium aluminum hydride, diphenyldilithium and diphenylpotassium lithium.

Although it is appreciated that when R, in the above defined general formula, does not comprise at least one hydrocarbon radical, the group I, II and III metal compounds of the present invention can not normally be termed organometallic compounds, compounds lacking at least one hydrocarbon radical comprise such a relatively small number of the total number of compounds included by said general formula that for the purposes of the present invention, it is intended that these compounds be included within the generic term, organometallic compound. Accordingly, in the specification and in the claims, it is intended, and therefore it should be understood, that the term, organometallic compound, refers to all the compounds included within the scope of the above defined general formula.

Using the catalysts of this invention, polymerization of the olefinic charging stock can be accomplished in the absence of liquids, solvents or diluents, for example, in the gas phase, but it is usually easier to effect polymerization in the presence of a substantially inert liquid reaction medium which functions as partial solvent for the monomer, a solvent for the organometallic compound, as a heat transfer agent, and as a liquid transport medium to remove normally solid polymerization products as a dispersion from the polymerization reactor, thus permitting efficient and continuous polymerization operations. Accordingly, an inert liquid reaction medium is preferably supplied to the reaction zone.

Several classes of hydrocarbons or their mixtures which are liquid and substantially inert under polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butanes, n-pentane, n-hexene, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like are suitable. Also members of the aromatic hydrocarbon series, such as ethylbenzene, isopropylbenzene, sec-butylbenzene, t-butylbenzene, ethyltoluene, ethylxylenes, hemimellitene, pseudocumene, perhnitene, isodurene, diethylbenzenes, isoamylbenzene, and particularly the mononuclear aromatic hydrocarbons such as benzene, toluene, xylenes, mesitylene and xylene-p-cymene mixtures, and the like are completely suitable. Aromatic hydrocarbon fractions obtained by the selective extraction of aromatic naphthas, from hydroforming operations such as distillates or bottoms, from cycle stock fractions or cracking operations, etc., and certain alkyl naphthalenes which are liquid under the polymerization reaction conditions, for example, 1-methyl-naphthalene, 2-isopropylnaphthalene, 1-n-amylnaphthalene and the like, or commercially produced fractions containing these hydrocarbons and the like are also suitable.

The proportion of surface reacted particulate inorganic solid to organometallic compound utilized in preparing the catalyst is not usually a critical feature of the process. Moreover, if this proportion is expressed as a simple molar or weight ratio, it may not be particularly meaningful because, as indicated above, the efficiency of said surface reacted solids (on a weight or molar basis) is highly dependent upon the proportion of transition metal halide chemically combined therewith and the manner in which each atom of transition metal is chemically combined. Accordingly, in order to be most meaningful the relationship between catalyst components should be expressed as a function of the amount of transition metal compound which has reacted with the surface of the finely divided solid. We have found from experience that a molar ratio of from 0.1 to 3 mols of the organometallic compound per mol of transition metal chemically combined with the surface of the finely divided solid is to be preferred.

The quantity of catalyst i.e., comprising both the surface reacted finely divided solid and the organometallic compound, to be utilized in the polymerization reaction may vary, the precise proportion selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when (a) a very fine particle size oxide has been utilized as the inorganic solid and (b) the transition metal halide reaction has been conducted in such a manner as to leave at least two halogen atoms on each transition metal atom.

Harmful impurities in the liquid hydrocarbon reaction medium can be effectively neutralized prior to the formation therein, or addition thereto, of the catalyst or catalyst components by treating the liquid medium with a metal alkyl as set forth in U.S. Patent No. 2,991,157, to Adam Orzechowski and James MacKenzie. The olefinic charging stocks can be purified by any known means such as bubbling said stocks through a solution of a metal alkyl in a hydrocarbon solvent prior to their introduction into the polymerization reactor.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can be cooled by heat exchange inside or outside the reaction zone.

The contact time or space velocity employed in the polymerization process will be selected with reference to the other process variable such as the particular catalysts utilized, the specific type of product desired, and the extent of olefin conversion desired in any given run or pass over the catalyst. In general, this variable is readily adjustable to obtain the desired results.

There follow a number of illustrative non-limiting examples:

*Example 1*

To a 1000 milliliter, three neck, glass reaction vessel there was added 10 grams of "Cab-o-sil," a pyrogenic silica produced by Godfrey L. Cabot, Inc. which has an average particle diameter of about 20 millimicrons and a hydroxyl group content (based on ignition losses of dry material) on the surface thereof of between about 2.3 and 2.7 milliequivalents/gram. Said reaction vessel was then placed in a vacuum drying oven heated to a temperature of about 110° C. for about twelve hours. Subsequently, the vessel was sealed without exposing said silica to the atmosphere, and there were charged to said vessel 9.8 millimoles of titanium tetrachloride and 500 milliliters of isooctane. The vessel was then continuously stirred, and heated to, and maintained at the refluxing temperature of isooctane for a period of 2.3 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream and by testing the liquid contents of the vessel for the absence therein of titanium tetrachloride, and the said silica was found to have $9.8 \times 10^{-3}$ gram atoms of titanium chemically bound to the surface thereof. 0.25 grams of this surface reacted silica containig about $0.25 \times 10^{-4}$ gram atoms of titanium on the surface thereof, and suspended in about 12 milliliters of isooctane was then transferred without exposure to the atmosphere from this reaction vessel to a 500 milliliter, three neck, glass reaction vessel which had been previously flushed with dry nitrogen. 88 milliliters of isooctane was then charged to this second vessel and the vessel was saturated with ethylene. Next, 0.25 millimoles of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 37.2 grams of polyethylene which had a density of about 0.96 had been produced. The polymer product was a powdery material and was found to have a crystalline melting point of about 130–135° C. It was further found that none of the ethylene had been converted to a normally liquid product.

*Example 2*

This example was a duplicate of Example 1, except that the silica was not dried prior to treatment with the titanium tetrachloride. Also, although the treatment between the silica and the titanium tetrachloride took place under a nitrogen atmosphere, the reaction vessel was not continuously swept with a nitrogen stream, as was done in Example 1, and accordingly no HCl was removed from the vessel during the period that the treatment took place. The treatment was carried out at room temperature for 30 minutes. The catalyst was then formed as in Example 1 and utilized in a polymerization reaction as in Example 1. The reaction products were analyzed and it was found that only 4.9 grams of polyethylene had been produced.

*Example 3*

This example was a duplicate of Example 2, except that (a) during the treatment of the silica with the titanium tetrachloride, the reaction vessel was continuously swept with a nitrogen stream and (b) the treatment was carried out at 100° C. for 30 minutes rather than at room temperature. Following formation of the catalyst and the use thereof in a polymerization reaction, all as described in Example 1, the reaction product was analyzed; it was found that 5.1 grams of polyethylene had been produced.

*Example 4*

To a 2,000 milliliter, three neck, glass reaction vessel there was added 20 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 19.6 millimoles of titanium tetrachloride and 1,100 milliliters of isooctane. The vessel was then continuously stirred, and heated to, and maintained at, the refluxing temperature of isooctane for a period of 3 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $19.6 \times 10^{-3}$ gram atoms of titanium chemically bound to the surface thereof. 0.5 gram of this surface reacted silica containing about $5 \times 10^{-4}$ gram atoms of titanium on the surface thereof, and suspended in about 25.5 milliliters of isooctane was then transferred without being exposed to the atmosphere from this reaction vessel to a second 2,000 milliliter, three neck, glass reaction vessel which had been previously flushed with dry nitrogen. 75 milliliters of isooctane was then charged to this second vessel and the vessel was saturated with ethylene. Next, 0.25 millimoles of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 93.9 grams of polyethylene had been produced.

*Example 5*

To a 1000 milliliter, three neck, glass reaction vessel there was added 10 grams of "Cab-o-sil" silica. Said reaction vessel was then placed in a vacuum drying oven heated to a temperature of about 110° C., for about 12 hours. Subsequently, the vessel was exposed to the atmosphere for about 5 minutes, after which time the vessel was sealed, flushed with nitrogen, and there was charged thereto 7 millimoles of titanium tetrachloride and 500 milliliters of isooctane. The reactor vessel was then maintained at 25° C. for a period of 0.7 hours, during which time the vessel was continuously stirred but was not swept with nitrogen. Subsequently, the extent of the reaction between the titanium tetrachloride and the silica was determined by testing the liquid contents of the vessel and finding the complete absence therein of titanium tetrachloride; the said silica therefore was determined to have $7 \times 10^{-3}$ gram atoms of titanium adsorbed on the surface thereof. 0.67 grams of this silica containing about $5 \times 10^{-4}$ gram atoms of titanium adsorbed on the surface thereof, and suspended in about 33.5 milliliters of isooctane was then transferred from this reaction vessel without exposure to the atmosphere to a 500 milliliter, three neck, glass reaction vessel which had been previously flushed with dry nitrogen. 66.5 milliliters of isooctane was then charged to this second vessel and the vessel was saturated with ethylene. Next 0.25 millimoles of triisobutyl aluminum was added and the contents of said second reaction vessel were continuously and vigorously stirred, and ethylene was continuously swept through the reaction vessel for about 4 hours. The reaction products were analyzed and it was found that no polyethylene had been produced.

*Example 6*

To a 1,000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 7.4 millimoles of titanium tetrachloride and 500 milliliters of isooctane. The vessel was then continuously stirred and was maintained at room temperature for a period of 1 hour under conditions such that no HCl was removed (the reactor was not swept with nitrogen during the reaction). Subsequently, the extent of the reaction between the titanium tetrachloride and the silica was determined by measuring the amount of titanium tetrachloride found in the supernatant liquid and the said silica was found to have $7.4 \times 10^{-3}$ gram atoms of titanium adsorbed on the surface thereof. 0.67 gram of this treated silica having about $5 \times 10^{-4}$ gram atoms of titanium adsorbed on the surface thereof, and suspended in about 33.5 milliliters of isooctane was then transferred without exposure to the atmosphere from this reaction vessel to a 500 milliliter, three neck, glass reaction vessel which had been previously flushed with dry nitrogen. 66.5 milliliters of isooctane was then charged to this second vessel and the vessel was saturated with ethylene. Next, 0.25 millimole of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 22.6 grams of polyethylene had been produced.

*Example 7*

To a 1000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 7.4 millimoles of titanium tetrachloride and 530 milliliters of isooctane. The vessel was then continuously agitated and maintained at room temperature for a period of 0.5 hour, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $7.4 \times 10^{-3}$ gram atoms of titanium chemically bound to the surface thereof. 0.695 gram of this silica containing about $5 \times 10^{-4}$ gram atoms of titanium chemically bound to the surface thereof, and suspended in about 24.6 milliliters of isooctane was then transferred without exposure to the atmosphere from this reaction vessel to a 500 milliliter, three neck, glass reaction vessel which had been previously flushed with dry nitrogen. 65.4 milliliters of isooctane was then charged to this second vessel and the vessel was saturated with ethylene. Next, 0.25 millimole of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 75 grams of polyethylene had been produced.

*Example 8*

To a 1000 milliliter, three neck, glass reaction vessel there was added 10 grams of "P–25" titania, a pyrogenic titania produced by Deutsche Gold-Und Silber-Scheideanstalt Vormals Roessler, Germany, which has an average particle diameter of about 20 millimicrons and a hydroxyl group content on the surface thereof (as measured by ignition losses of dry titania) of between about 1 and 1.4 milliequivalents/gram. Said reaction vessel was then placed in a vacuum drying oven heated to a temperature of about 110° C., for about twelve hours. Subsequently, the vessel was sealed without exposing said titania to the atmosphere and there were charged to said vessel 2.8 millimoles of titanium tetrachloride and 500 milliliters of isooctane. The vessel was then continuously agitated, and heated to, and maintained at the refluxing temperature of isooctane for a period of 3 hours, while the HCl produced was continuously removed by sweeping the reactor vessel with purified nitrogen. Subsequently, the extent of the reaction between the titania and the titanium tetrachloride was determined by measuring the quantity of HCl removed from the vessel by the nitrogen stream, and by determining the titanium tetrachloride content of the supernatant liquid and the said titania was found to have $2.8 \times 10^{-3}$ gram atoms of titanium chemically bound to the surface thereof. 0.84 gram of this titania containing about $2.5 \times 10^{-4}$ gram atoms of titanium on the surface thereof, and suspended in about 42 milliliters of isooctane was then transferred without being exposed to the atmosphere from this reaction vessel to a 500 milliliter, three neck, glass reaction vessel which had been previously flushed with dry nitrogen. 58 milliliters of isooctane was then charged to this second vessel and the vessel was saturated with ethylene. Next, 0.25 millimole of triisobutyl aluminum was added and the contents of said second reaction vessel were continuously and vigorously stirred, and ethylene was continuously swept through the reaction vessel at a rate somewhat faster than its consumption for about 4.5 hours. The reaction products were analyzed and it was found that 29.5 grams of polyethylene had been produced.

*Example 9*

To a 1000 milliliter, three neck, glass reaction vessel there was added 10 grams of "Hi-Sil-X-303," a precipitated silica produced by Columbia Southern Chemical Corp., and which has an average particle diameter of about 23 millimicrons and a hydroxyl group content on the surface thereof (as measured by ignition losses of the dry silica) of about 4.3 milliequivalents/gram. Said reaction vessel was then placed in a vacuum drying oven heated to a temperature of about 110° C., for about twelve hours. Subsequently, the vessel was sealed without exposing said silica to the atmosphere and there were charged to said vessel 5.6 millimoles of titanium tetrachloride and 500 milliliters of isooctane. The vessel was then continuously agitated and heated to, and maintained at the refluxing temperature of isooctane for a period of 3.5 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $5.6 \times 10^{-3}$ gram atoms of titanium chemically bound to the surface thereof. 0.42 gram of this silica containing about $2.5 \times 10^{-4}$ gram atoms of titanium chemically bound to the surface thereof, and suspended in about 21 milliliters of isooctane was then transferred without exposure to the atmosphere from this reaction vessel to a 500 milliliter, three neck, glass reaction vessel which had been previously flushed with dry nitrogen. 79 milliliters of isooctane was then charged to this second vessel and the vessel was saturated with ethylene. Next, 0.25 millimole of triisobutyl aluminum was added, and the contents of said second reaction vessel were continuously and vigorously stirred, and ethylene was continuously swept through the reaction vessel at a rate somewhat faster than its consumption for about 1.75 hours. The reaction products were analyzed and it was found that 17.9 grams of polyethylene had been produced.

*Example 10*

To a 500 milliliter, three neck, glass reaction vessel there was added 5 grams of "Alon," a pyrogenic alumina produced by Deutsche Gold-Und Silber-Scheideanstalt Vormals Roessler which has an average particle diameter of about 10–40 millimicrons. Said reaction vessel was then placed in a vacuum drying oven heated to a temperature of about 110° C., for about twelve hours. Subsequently, the vessel was sealed without exposing said alumina to the atmosphere and there were charged to said vessel 4.7 millimoles of titanium tetrachloride and 250 milliliters of isooctane. The vessel was then continuously stirred and heated to, and maintained at the refluxing temperature of isooctane for a period of 4 hours, while the HCl produced was continuously removed by sweeping the reactor vessel with purified nitrogen. Subsequently, the extent of the reaction between the alumina and the titanium tetrachloride was determined by measuring the quantity of HCl removed from the vessel by the nitrogen stream, and by testing the liquid contents of the vessel for the absence therein of titanium tetrachloride, and the said alumina was found to have $2.7 \times 10^{-3}$ gram atoms of titanium chemically bound to the surface thereof. The excess titanium tetrachloride was removed by washing with isooctane. 0.44 grams of this alumina containing about $2.5 \times 10^{-4}$ gram atoms of titanium chemically bound to the surface thereof, and suspended in about 22 milliliters of isooctane was then transferred from this reaction vessel to a second 500 milliliter, three neck, glass reaction vessel which had been previously flushed with dry nitrogen. 78 milliliters of isooctane was then charged to this second vessel and the vessel was saturated with ethylene. Next, 0.25 millimoles of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 22.5 grams of polyethylene had been produced.

Example 11

To a 1000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 6 millimoles of titanium tetrachloride and 530 milliliters of isooctane. The vessel was then continuously stirred and heated to, and maintained at the refluxing temperature of isooctane for a period of 5 minutes, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by determining the titanium tetrachloride content of the supernatant liquid, and the said silica was found to have $6 \times 10^{-3}$ gram atoms of titanium chemically bound to the surface thereof. 0.85 grams of this silica containing about $5 \times 10^{-4}$ gram atoms of titanium chemically bound to the surface thereof, and suspended in about 42.8 milliliters of isooctane was then transferred from this reaction vessel to a 500 milliliter, three neck, glass reaction vessel which had been previously flushed with dry nitrogen. 57.2 milliliters of isooctane was then charged to this second vessel and the vessel was saturated with ethylene. Next, 0.25 millimoles of triisobutyl aluminum were added and the contents of said second reaction vessel were continuously and vigorously stirred, and ethylene was continuously swept through the reaction vessel at a rate somewhat faster than its consumption for about four hours. The reaction products were analyzed and it was found that 49.7 grams of polyethylene had been produced.

Example 12

To a 1000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 8.5 millimoles of titanium tetrachloride and 530 milliliters of isooctane. The vessel was then continuously agitated and maintained at 25° C., for a period of 10 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $8.5 \times 10^{-3}$ gram atoms of titanium chemically bound to the surface thereof. 0.59 grams of this silica containing about $5 \times 10^{-4}$ gram atoms of titanium chemically bound to the surface thereof, and suspended in about 29.4 milliliters of isooctane was then transferred from this reaction vessel to a 500 milliliter, three neck, glass reaction vessel which had been previously flushed with dry nitrogen. 70.6 milliliters of isooctane was then charged to this second vessel and the vessel was saturated with ethylene. Next, 0.25 millimoles of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 93.6 grams of polyethylene had been produced.

Example 13

To a 1,000 milliliter, a three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 11.5 millimoles of finely divided zirconium tetrachloride and 500 milliliters of benzene. The vessel was then heated to, and maintained at the refluxing temperature of benzene for a period of 6 hours, while the HCl produced was continuously removed by sweeping the reactor vessel with purified nitrogen. The nitrogen stream was analyzed and it was found that 17 milliequivalents of HCl had been removed from the vessel. 0.43 grams of this silica containing about $5 \times 10^{-4}$ gram atoms of zirconium chemically bound to the surface thereof, and suspended in about 20.4 milliliters of isooctane was then transferred from this reaction vessel to a second 1,000 milliliter, three neck, glass reaction vessel which had been previously flushed with dry nitrogen. 179.6 milliliters of isooctane was then charged to this second vessel and the vessel was saturated with ethylene. Next, 0.25 millimoles of triisobutyl aluminum was added and the contents of said second reaction vessel were continuously and vigorously stirred and ethylene was continuously swept through the reaction vessel at a rate somewhat faster than its consumption for about four hours. The reaction products were analyzed and it was found that 101 grams of polyethylene had been produced.

Example 14

To a 500 milliliter, three neck, glass reaction vessel which had previously been flushed with dry nitrogen there was charged 0.5 millimoles of finely divided zirconium tetrachloride (the same as used in Example 13 above) and 100 milliliters of isooctane. Next, 0.25 millimoles of triisobutyl aluminum was added, the vessel was saturated with ethylene, the contents of said reaction vessel were continuously and vigorously stirred, and ethylene was continuously swept through the reaction vessel for about 4 hours. There was no visible reaction and no polyethylene was produced.

Example 15

To a 1,000 milliliter, three neck, glass reaction vessel there was added 10 grams of "Cab-o-sil" silica. Said reaction vessel was then placed in an oven heated to a temperature of about 110° C., for about twelve hours. Subsequently, the vessel was sealed without exposing said silica to the atmosphere and there were charged to said vessel 11.5 millimoles of the finely divided zirconium tetrachloride (the same as utilized in Example 13) and 500 milliliters of isooctane. The vessel was then maintained at room temperature for a period of 0.5 hours, during which time, unlike the procedure in Example 13, the reactor vessel was not swept by a stream of nitrogen. 20.4 millimoles of this slurry containing 0.43 grams of silica and 0.5 millimoles of zirconium tetrachloride which was not bound to the silica, was then transferred without exposure to atmosphere from this reaction vessel to a second 1,000 milliliter, three neck, glass reaction vessel which had been previously flushed with dry nitrogen. 180 milliliters of isooctane was then charged to this second vessel and the vessel was saturated with ethylene. Next, 0.25 millimoles of triisobutyl aluminum was added and the contents of said second reaction vessel were continuously and vigorously stirred, and ethylene was continuously swept through the reaction vessel for about four hours. The reaction products were analyzed and it was found that no polyethylene had been produced.

*Example 16*

To a 1,000 milliliter, three neck, glass reaction vessel there was added 10 grams of "Cab-o-sil" silica. Said reaction vessel was then placed in an oven heated to a temperature of about 110° C., for about twelve hours. Subsequently, the vessel was sealed without exposing said silica to the atmosphere and there were charged to said vessel 11.5 millimoles of finely divided zirconium tetrachloride (the same as utilized in Example 13), and 500 milliliters of isooctane. The vessel was then maintained at the refluxing temperature of isooctane for a period of 5 hours, while the HCl produced was continuously removed by sweeping the reactor vessel with purified nitrogen. The quantity of HCl removed from the flask was determined to be 17 milliequivalents. 0.43 grams of this silica containing about 0.5 millimoles of zirconium partly bound and partly adsorbed on the surface thereof, and suspended in about 20.4 milliliters of isooctane was then transferred from this reaction vessel to a 500 milliliter, three neck, glass reaction vessel which had been previously flushed with dry nitrogen. 180 milliliters of isooctane was then charged to this second vessel and the vessel was saturated with ethylene. Next, 0.25 millimoles of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 32.5 grams of polyethylene had been produced.

*Example 17*

To a 2,000 milliliter, three neck, glass reaction vessel there was added 25 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 24.5 millimoles of titanium tetrachloride and 1200 milliliters of isooctane. The vessel was then continuously agitated and heated to, and maintained at the refluxing temperature of isooctane for a period of 4 hours, while the HCl produced was continuously removed by sweeping the reactor vessel with purified nitrogen. Subsequently, the extent of reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $24.5\times 10^{-3}$ gram atoms of titanium chemically bound to the surface thereof. 1 gram of this silica containing about $1\times 10^{-3}$ gram atoms of titanium chemically bound to the surface thereof, and suspended in about 51 milliliters of isooctane was then transferred from this reaction vessel to a 1,000 milliliter, three neck, glass reaction vessel which had been previously flushed with dry nitrogen. 200 milliliters of isooctane was then charged to this second reaction vessel and the vessel was saturated with ethylene. Next, 0.24 millimole of freshly distilled triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 140 grams of polyethylene had been produced.

*Example 18*

To a 1000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 8.5 millimoles of titanium tetrachloride and 530 milliliters of isooctane. The vessel was then continuously agitated and maintained at room temperature for a period of 10 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $8.5\times 10^{-3}$ gram atoms of titanium chemically bound to the surface thereof. 0.59 gram of this silica containing about $5\times 10^{-5}$ gram atoms of titanium chemically bound to the surface thereof, and suspended in about 29.4 milliliters of isooctane was then transferred from this reaction vessel to a 500 milliliter, three neck, glass reaction vessel which had been previously flushed with dry nitrogen. 70.6 milliliters of isooctane was then charged to this second vessel and the vessel was saturated with ethylene. Next, 0.25 millimole of butyl lithium was added and the contents of said second reaction vessel were continuously and vigorously stirred, and ethylene was continuously swept through the reaction vessel at a rate somewhat faster than its consumption for about 0.5 hour. Then an additional 0.5 millimole of butyl lithium was added to the reaction vessel and the reaction was continued as before for 3.5 more hours. The reaction products were analyzed and it was found that 28.7 grams of polyethylene had been produced.

*Example 19*

To a 2,000 milliliter, three neck, glass reaction vessel there was added 25 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 24.5 millimoles of titanium tetrachloride and 1280 milliliters of isooctane. The vessel was then heated to and maintained at the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $24.5\times 10^{-3}$ gram atoms of titanium chemically bound to the surface thereof. 1 gram of this silica containing about $1\times 10^{-3}$ gram atoms of titanium chemically bound to the surface thereof, and suspended in about 51 milliliters of isooctane was then transferred without exposure to the atmosphere from this reaction vessel to a second 2,000 milliliter, three neck, glass reaction vessel which had been previously flushed with dry nitrogen. 200 milliliters of isooctane was then charged to this second vessel and the vessel was saturated with ethylene. Next, 0.25 millimole of freshly distilled triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 141 grams of polyethylene had been produced.

*Example 20*

To a 500 milliliter, three neck, glass reaction vessel there was added 5 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 5 millimoles of vanadium trichloride and 8 milliliters of methanol. The vessel was then continuously stirred, and maintained at room temperature for a period of 2 hours, while the HCl produced was continuously removed by sweeping the reactor vessel with purified nitrogen. Subsequently, the extent of the reaction between the vanadium trichloride and the silica was determined by measuring the quantity of HCl removed from the vessel by the nitrogen stream, and by testing the liquid contents of the vessel for the absence therein of vanadium trichloride and the said silica was found to have $5 \times 10^{-3}$ gram atoms of vanadium on the surface thereof. The vessel was then swept by a dry but heated nitrogen stream until all the methanol had evaporated. 250 milliliters of isooctane was then added to the vessel in order to produce a slurry therein. 100 milliliters of this slurry containing about $2 \times 10^{-3}$ gram atoms of vanadium trichloride bound to the surface of 2 grams of silica, was then transferred from this reaction vessel to a 500 milliliter, stainless steel bomb which had been previously flushed with dry nitrogen. Next, 2 millimoles of triisobutyl aluminum and 120 grams of liquid propylene were added and the bomb was continuously agitated in a 50° C., water bath for about 90 hours. The reaction products were analyzed and it was found that 11.9 grams of polypropylene having a weight average molecular weight of about 450,000 and a crystalline melting point of about 170° C., had been produced.

*Example 21*

To a 1,000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 10 millimoles of titanium tetrachloride and 530 milliliters of benzene. The vessel was then heated to and maintained at about 100° C. for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $10 \times 10^{-3}$ gram atoms of titanium chemically bound to the surface thereof. 1.85 grams of this silica containing about $2 \times 10^{-3}$ gram atoms of titanium chemically bound to the surface thereof, and suspended in about 80 milliliters of benzene, was then transferred from this reaction vessel to a 500 milliliter stainless steel bomb, which had been previously evacuated and flushed with dry nitrogen. 20 milliliters of benzene was then charged to the bomb. Next, 2 millimoles of triisobutyl aluminum and 100 grams of dry propylene were added, and the bomb was continuously rotated in a 50° C. water bath. The reaction products were analyzed and it was found that 79 grams of polypropylene had been produced.

*Example 22*

To a 1000 milliliter, three neck, glass reaction vessel there was added 10 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 20 millimoles of titanium tetrachloride and 570 milliliters of isooctane. The vessel was then agitated and maintained at room temperature for a period of about 5 minutes, while the vessel was continuously swept by a slow stream of purified nitrogen. The extent of reaction between the titanium tetrachloride and the silica was then determined by determining the titanium tetrachloride content of the supernatant solution in the vessel and the HCl content of the nitrogen sweep stream. It was found that 8 moles of titanium tetrachloride had been adsorbed but that substantially no HCl had been evolved. The mixture was next allowed to stand overnight without stirring or sweeping with nitrogen. Upon analysis it was found that substantially no change had occurred, i.e., no more titanium tetrachloride had been adsorbed and no HCl had been produced.

The mixture was next continuously agitated and swept with dry nitrogen for 6 hours. By analysis of the supernatant liquid, it was determined that an addition 2 millimoles of titanium tetrachloride had been adsorbed. Moreover, and of even greater importance, analysis of the nitrogen sweep gas revealed that 13 milliequivalents of HCl had been produced. The mixture was then refluxed at 100° C. for an additional 7 hours and it was found that an additional 2 to 3 millimoles of titanium tetrachloride were adsorbed and an additional 4 milliequivalents of HCl produced.

This example shows that although the adsorption of titanium tetrachloride by silica is relatively fast, the chemical reaction that produces HCl and the improved catalysts of the present invention involves an equilibrium which is displaced to the right (see Equations 1–3, pages 11 and 12, of this specification) only when HCl is produced and removed from the system.

*Example 23*

To a 1,000 milliliter, three neck, glass reaction vessel there was added 30 grams of "Cab-o-sil" silica. Said reaction vessel was then placed in a vacuum drying oven heated to a temperature of about 110° C., for about twelve hours. The vessel was then sealed without exposing said silica to the atmosphere and there were charged to said vessel 40.5 millimoles of titanium tetrachloride and 700 milliliters of isooctane. The vessel was then continuously stirred and heated to, and maintained at the refluxing temperature of isooctane for a period of 7 hours, while the HCl produced was continuously removed by sweeping the reactor vessel with purified nitrogen. The extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $40.5 \times 10^{-3}$ gram atoms of titanium chemically bound to the surface thereof. 0.9 gram of this silica containing about $1.2 \times 10^{-3}$ gram atoms of titanium chemically bound to the surface thereof, and suspended in about 29 milliliters of isooctane was then transferred, without being exposed to the atmosphere, from this reaction vessel to a 1,000 milliliter stirred autoclave which had been previously flushed with dry nitrogen. 20 milliliters of isooctane, 180 grams of liquid propylene and 204 grams of ethylene were then charged to the autoclave. Next 2 millimoles of triisobutyl aluminum was added and the contents of said autoclave were continuously and vigorously stirred at an initial temperature of 50° C. for about 3.75 hours. In addition, ethylene was continuously charged to the autoclave through a regulator which maintained a constant pressure in the autoclave. The reaction products were analyzed and it was found that 256 grams of a rubbery copolymer had been produced.

*Example 24*

To a 1,000 milliliter, three neck, glass reaction vessel, there was added 20 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 28 millimoles of titanium tetrachloride and 600 milliliters of isooctane. The vessel was then heated to and maintained at the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $28 \times 10^{-3}$ gram atoms of titanium chemically bound to the surface thereof. 0.8 gram of this silica containing about $1.2 \times 10^{-3}$ gram atoms of titanium chemically bound to the surface thereof, and suspended in about 26 milliliters of isooctane was then transferred without exposure to atmosphere from this reaction vessel to a 12 ounce "pop" bottle which had been previously flushed with dry nitrogen. 125 milliliters of isooctane, 13.5 grams of liquid butene and 3.3 grams of liquid propylene were then charged to the bottle. Next, 2 millimoles of triisobutyl aluminum was added and the bottle was then continuously and vigorously agitated in a 50° C. water bath for about 19 hours. The reaction products were analyzed and it was found that 12 grams of a rubbery copolymer had been produced.

*Example 25*

To a 2,000 milliliter, three neck, glass reaction vessel there was added 30 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 40.5 millimoles of titanium tetrachloride and 700 milliliters of isooctane. The vessel was then heated to and maintained at the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream and by testing the liquid contents of the vessel for the absence therein of titanium tetrachloride, and the said silica was found to have $40.5 \times 10^{-3}$ gram atoms of titanium chemically bound to the surface thereof. 0.9 gram of this silica containing about $1.2 \times 10^{-3}$ gram atoms of titanium chemically bound to the surface thereof, and suspended in about 29 milliliters of isooctane was then transferred, without exposure to the atmosphere, from this reaction vessel to a 12 ounce "pop" bottle which had been previously flushed with dry nitrogen. 55 milliliters of isooctane and about 13.0 grams of liquid butadiene were then charged to this second vessel. Next, 1 millimole of triisobutyl aluminum was added and the bottle was then continuously and vigorously agitated in a 50° C. water bath for about 18 hours. The reaction products were analyzed and it was found that 12.7 grams of polybutadiene had been produced.

*Example 26*

To a 1,000 milliliter, three-neck, glass reaction vessel there was added 20 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 28 millimoles of titanium tetrachloride and 600 milliliters of isooctane. The vessel was then heated to and maintained at the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $28 \times 10^{-3}$ gram atoms of titanium on the surface thereof. 0.8 gram of this silica containing about $1.2 \times 10^{-3}$ gram atoms of titanium chemically bound to the surface thereof, and suspended in about 26 milliliters of isooctane was then transferred, without exposure to the atomsphere, from this reaction vessel to a 12 ounce "pop" bottle which had previously been flushed with dry nitrogen. 55 milliliters of isooctane and 28.2 grams of butene-1 were then charged to the bottle. Next, 1 millimole of triisobutyl aluminum was added and the bottle was then continuously and vigorously agitated in a 50° C. water bath for about 20 hours. The reaction products were analyzed and it was found that 24.5 grams of polybutene having a weight average molecular weight of about 250,000 and a crystalline melting point of about 140° C. had been produced.

*Example 27*

To a 500 milliliter, three neck, glass reaction vessel there is added 10 grams of "Cab-o-sil" silica. Said reaction vessel is then placed in a vacuum drying oven heated to a temperature of about 110° C., for about twelve hours. Subsequently, the vessel is sealed without exposing said silica to the atmosphere and there is charged to said vessel 10 millimoles of titanium tetrabromide and 300 milliliters of isooctane. The vessel is then heated to and maintained at the refluxing temperature of isooctane for a period of 10 hours, while the HBr produced is continuously removed by sweeping the reactor vessel with purified nitrogen. Subsequently, the extent of the reaction between the titanium tetrabromide and the silica is determined by measuring the quantity of HBr removed from the vessel by the nitrogen stream, and by testing the liquid contents of the vessel for the absence therein of titanium tetrabromide, and the said silica is found to have $10 \times 10^{-3}$ gram atoms of titanium chemically bound to the surface thereof. 1 gram of this silica containing about $1 \times 10^{-3}$ gram atoms of titanium chemically bound to the surface thereof, and suspended in about 30 milliliters of isooctane is then transferred, without exposure to the atmosphere, from this reaction vessel to a second 500 milliliter, three neck, glass reaction vessel which has been previously flushed with dry nitrogen. 70 milliliters of isooctane is then charged to this second vessel and the vessel is saturated with ethylene. Next, 0.5 millimole of aluminum diethyl chloride is added and the contents of said second reaction vessel are continuously and vigorously stirred, and ethylene is continuously swept through the reaction vessel at a rate somewhat faster than its consumption for about four hours. The reaction products are analyzed and it is found that about 87 grams of polyethylene have been produced.

*Example 28*

To a 500 milliliter, three neck, glass reaction vessel there was added 10 grams of "Cab-o-sil" silica. Said reaction vessel was then placed in an oven heated to a temperature of about 110° C., for about twelve hours. Subsequently, there were charged to said vessel 9.8 millimoles of titanium tetrachloride and 250 milliliters of isooctane. The vessel was then heated to and maintained at the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride and the said silica was found to have $9.8 \times 10^{-3}$ gram atoms of titanium chemically bound to the surface thereof..

2.24 grams of this silica containing about $2.2\times10^{-3}$ gram atoms of titanium chemically bound to the surface thereof, and suspended in about 56 milliliters of isooctane was then transferred, without exposure to the atmosphere, from this reaction vessel to a 12 ounce "pop" bottle which had been previously flushed with dry nitrogen. 94 milliliters of isooctane, and 36 grams of styrene were then charged to the bottle. Next, 2.6 millimoles of triisobutyl aluminum was added and the bottle was continuously and vigorously agitated in a 25° C. air bath for about 90 hours. The reaction products were analyzed and it was found that 5 grams of polystyrene which was 40% soluble in boiling methyl ethyl ketone had been produced.

*Example 29*

To a 500 milliliters, three neck, glass reaction vessel there was added 10 grams of "Cab-o-sil" silica. Said reaction vessel was then placed in an oven heated to a temperature of about 110° C., for about twelve hours. Subsequently, there were charged to said vessel 9.8 millimoles of titanium tetrachloride and 250 milliliters of isooctance. The vessel was then heated to and maintained at the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by testing the liquid contents of the vessel for the absence therein of titanium tetrachloride, and the said silica was found to have $9.8\times10^{-3}$ gram atoms of titanium chemically bound to the surface thereof. 0.41 gram of this silica containing about $4\times10^{-4}$ gram atoms of titanium chemically bound the surface thereof, and suspended in about 10.2 milliliters of isooctane was then transferred, without exposure to the atmosphere, from this reaction vessel to a 12 ounce "pop" bottle which had been previously flushed with dry nitrogen. 140 millititers of isooctane and 16.7 grams of isoprene were then charged to the bottle. Next, 2 millimoles of triisobutyl aluminum was added and the bottle was continuously and vigorously agitated in a 25° C. air bath for about 113 hours. The reaction products were analyzed and it was found that 11 grams of rubbery polyisoprene had been produced.

*Example 30*

To a 500 milliliter, three neck, glass reaction vessel there was added 10 grams of "Cab-o-sil" silica. Said reaction vessel was then placed in an oven heated to a temperature of about 110° C., for about twelve hours. Subsequently, the vessel was sealed without exposing said silica to the atmosphere and there were charged to said vessel 10 millimoles of finely divided titanium trichloride and 250 milliliters of isooctane. The vessel was then continuously agitated and heated to, and maintained at the refluxing temperature of isooctane for a period of 4 hours, while the vessel was continuously swept by a stream of purified nitrogen. 12.5 milliliters of this slurry containing about $5\times10^{-4}$ gram atoms of titanium and 0.5 gram of silica was then transferred, without being exposed to the atmosphere, from this reaction vessel to a second 500 milliliter, three neck, glass reaction vessel which had been previously flushed with dry nitrogen 87.5 milliliters of isooctane was then charged to this second vessel and the vessel was saturated with ethylene. Next, 0.25 millimote of triisobutyl aluminum was added and the contents of said second reaction vessel were continuously and vigorously stirred, and ethylene was continuously swept through the reaction vessel for about four hours. The reaction products were analyzed and it was found that no solid polymer of the ethylene had been produced.

*Example 31*

To a 2,000 milliliter, three neck, glass reaction vessel there was added 30 grams of "Cab-o-sil" silica. Said reaction vessel was then placed in an oven heated to a temperature of about 110° C., for about twelve hours. Subsequently, the vessel was sealed without exposing said silica to the atmosphere and there was charged to said vessel 40.5 millimoles of titanium tetrachloride and 1200 milliliters of isooctane. The vessel was then continuously agitated and heated to, and maintained at the refluxing temperature of isooctane for a period of 5 hours, while the HCl produced was continuously removed by sweeping the reactor vessel with purified nitrogen. 0.45 gram of this silica containing about $6\times10^{-4}$ gram atoms of titanium chemically bound to the surface thereof, and suspended in about 18 milliliters of isooctane was then transferred from this reaction vessel to a 1000 milliliter stirred autoclave which had been previously flushed with dry nitrogen. 40 milliliters of isooctane, 202 grams of liquid propylene, 8 grams of liquid butadiene and 11.9 grams of ethylene were then charged to the autoclave. Next, 1 millimole of triisobutyl aluminum was added and the contents of the autoclave were continuously and vigorously stirred, and ethylene was continuously fed to the reaction vessel through a pressure regulator for about 2 hours during which time the temperature of the autoclave was maintained at about 50° C. The reaction products were analyzed and it was found that 53 grams of a rubbery terpolymer of propylene, ethylene and butadiene had been produced.

*Example 32*

To a 1,000 milliliter, three neck, glass reaction vessel there was added 10 grams of "Cab-o-sil" silica. Said reaction vessel was then placed in an oven heated to a temperature of about 110° C., for about twelve hours. Subsequently, the vessel was sealed without exposing said silica to the atmosphere and there were charged to said vessel 5.6 millimoles of tungsten hexachloride and 530 milliliters of benzene. The vessel was then heated to and maintained at 80° C. for a period of 5 hours, while the HCl produced was continuously removed by sweeping the reaction vessel with purified nitrogen. Subsequently, the extent of the reaction between the silica and the tungsten hexachloride was determined by measuring the quantity of HCl removed from the vessel and by testing the benzene solvent for the absence therein of tungsten chlorides and the said silica was found to have $5.6\times10^{-3}$ gram atoms of tungsten bound to the surface thereof. 1.94 grams of this treated silica, having $1.1\times10^{-3}$ gram atoms of tungsten bound to the surface thereof, and suspended in about 104 milliliters of benzene was then transferred from this reaction vessel to a 425 milliliter, stainless steel bomb which had been previously flushed with dry nitrogen. Then, the bomb was charged with ethylene to a pressure of 300 p.s.i.g. Next, 0.9 millimole of triisobutyl aluminum was added and the bomb was heated to a temperature of about 50° C. and was occasionally and mildly stirred for about 82 hours. The reaction products were analyzed and it was found that 8.9 grams of polyethylene had been produced.

*Example 33*

To a 1,000 milliliter, three neck, glass reaction vessel there was added 10 grams of "Cab-o-sil" silica. Said reaction vessel was then placed in an oven heated to a temperature of about 110° C. for about twelve hours. Subsequently, the vessel was sealed without exposing said silica to the atmosphere and there was charged to said vessel 10 millimoles of chromium trichloride complexed with approximately 30 millimoles of tetrahydrofuran and 500 milliteres of benzene. The chromium trichloride was complexed with tetrahydrofuran (THF) in order to increase solubility of the chromium trichloride in benzene. The vessel was then heated to and maintained at 80° C. for a period of 5.5 hours, while the HCl produced was continuously removed by sweeping the reaction vessel with purified nitrogen. Subsequently, the extent of the reaction between the silica and the chromium trichloride was determined by measuring the quantity of HCl removed from the vessel and by testing the benzene solvent for the absence therein of chromium chlorides and the said silica was found to have $10 \times 10^{-3}$ gram atoms of chromium bound to the surface thereof. 0.59 gram of this treated silica having about $5 \times 10^{-4}$ gram atoms of chromium bound to the surface thereof, and suspended in about 29 milliliters of benzene was then transferred from this reaction vessel to a 500 milliliter, three neck, glass reaction vessel which had been previously flushed with dry nitrogen. 71 milliliters of isooctane was then charged to this second vessel and the vessel was saturated with ethylene. Next, 1 millimole of aluminum triisobutyl was added and the contents of the vessel were heated to a temperature of about 60° C. and were continuously and vigorously stirred and ethylene was continuously swept through the reaction vessel at a rate somewhat faster than its consumption for about 3.2 hours. It was found that 14 grams of polyethylene had been produced.

*Example 34*

To a 1,000 milliliter, three neck, glass reaction vessel there is added 10 grams of magnesia, having an average particle diameter of about 1 micron and a hydroxyl group content on the surface thereof about 0.5 milliequivalent per gram. Said reaction vessel is then placed in an oven heated to a temperature of about 110° C., for about twelve hours. Subsequently, the vessel is sealed without exposing said magnesia to the atmosphere and there is charged to said vessel 3 millimoles of molybdenum trichloride and 500 milliliters of benzene. The vessel is then heated to and maintained at the refluxing temperature of benzene for a period of 4 hours, while the HCl produced is continuously removed by sweeping the reaction vessel with purified nitrogen. Subsequently, the extent of the reaction between the magnesia and the molybdenum trichloride is determined by measuring the quantity of HCl removed from the vessel and by testing the benzene for the absence therein of molybdenum trichloride and the said magnesia is found to have $3 \times 10^{-3}$ gram atoms of molybdenum bound to the surface thereof. 1 gram of this treated magnesia containing about $3 \times 10^{-4}$ gram atoms of molybdenum bound to the surface thereof, and suspended in about 100 milliliters of benzene is then transferred from this reaction vessel to a 425 milliliter, stainless steel bomb which has been previously flushed wtih dry nitrogen and said bomb is then saturated with isobutylene. Next, 1 millimole of lithium butyl, 20 grams of liquid butene-1 and 10 grams of liquid isoprene are added and the contents of the bomb are continuously and vigorously stirred, for about 10 hours. The reaction products are analyzed and it is found that 10 grams of a copolymer of butene-1 and isoprene have been produced.

In one embodiment of the present invention, hydrogen is introduced into the reaction zone during the polymerization reaction. The introduction of hydrogen is not essential but generally substantially improves the yield and produces a larger proportion of xylene-soluble product. Also, the molecular weight of the product can generally be varied by varying the quantity of hydrogen utilized. Although the exact function of the hydrogen is not completely understood, and there is therefore, no intention to be bound by this explanation, it is believed that the hydrogen serves as chain transfer agent, thereby promoting the dissociation of polymer chains from the polymerization sites of the catalysts and aiding the initiation and formation of additional polymer chains on said catalyst sites.

Non-limiting illustrative examples follow:

*Example 35*

To a 2,000 milliliter, three neck, glass reaction vessel there was added 20 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 19.6 millimoles of titanium tetrachloride and 1000 milliliters of isooctane. The vessel was then heated to, and maintained at, the refluxing temperature of isooctane for a period of 4 hours, while the HCl produced was continuously removed by sweeping the reactor vessel with purified nitrogen. Subsequently, the extent of the reaction between the titanium tetrachloride and the HCl was determined by measuring the quantity of HCl removed from the vessel by the nitrogen stream, and by determining the titanium tetrachloride content of the supernatant liquid, and the said silica was found to have $19.6 \times 10^{-3}$ gram atoms of titanium chemically bound to the surface thereof. 1 gram of this silica containing about $1 \times 10^{-3}$ gram atoms of titanium chemically bound to the surface thereof, and suspended in about 51 milliliters of isooctane was then transferred, without exposure to the atmosphere, from this reaction vessel to a 1,000 milliliter, stirred autoclave, which had been previously flushed with dry nitrogen. 2.60 milliliters of isooctane, and sufficient hydrogen and ethylene to establish a partial pressure therein of 300 lbs./in.$^2$ and 100 lbs./in.$^2$ respectively were then charged to the autoclave. Next, 1 millimole of triisobutyl aluminum was added, the autoclave was heated to 60° C. and the run was continued for about 0.5 hour during which time sufficient hydrogen and ethylene were supplied to the autoclave to maintain the partial pressures therein as set forth above. The reaction products were analyzed and it was found that 128.9 grams of polyethylene, having a weight average molecular weight of about 100,000 and a melt index of about 1.35 had been produced.

Polymerization runs essentially similar to the above run except that they were conducted in the absence of hydrogen, produced polymer having a weight average molecular weight in excess of 1,000,000 and a melt index of about zero.

*Example 36*

To a 1,000 milliliter, three neck, glass reaction vessel there was added 20 grams of "Cab-o-sil" silica. Said reaction vessel was then placed in a vacuum drying oven heated to a temperature of about 110° C., for about twelve hours. Subsequently, the vessel was sealed without exposing said silica to the atmosphere and there were charged to said vessel 28 millimoles of titanium tetrachloride and 600 milliliters of isooctane. The vessel was then heated to, and maintained at, the refluxing temperature of isooctane for a period of 4 hours, while the HCl produced was continuously removed by sweeping the reactor vessel with purified nitrogen. Subsequently, the extent of the reaction between the titanium tetrachloride and the silica was determined by measuring the quantity of HCl removed from the vessel by the nitrogen stream, and by determining the titanium tetrachloride content of the supernatant liquid, and the said silica was found to have $28 \times 10^{-3}$ gram atoms of titanium on the surface thereof. 0.8 gram of this silica containing about $1.1 \times 10^{-3}$ gram atoms of titanium bound to the surface thereof, and suspended in about 26 milliliters of isooctane was then transferred from this reaction vessel without exposure to the atmosphere to a 425 milliliter stainless steel bomb which had been previously flushed with dry nitrogen and which contained 1 atmosphere of hydrogen. 180 grams of liquid propylene was then charged to the bomb. Next, 2 millimoles of triisobutyl aluminum was added, and the contents of the bomb were then continuously and vigorously stirred, in a 50° C. water bath for about 17 hours. The reaction products were analyzed and it was found that 60 grams of polypropylene had been produced.

It is pointed out that by controlling (a) the number of hydroxyl groups present on the surface of the inorganic solid, (b) the proportion of transition metal halide which reacts with the inorganic solid, and (c) the temperature within the limits aforementioned, we can produce the inorganic solid catalyst components of the present invention having chemically linked directly to the surface of the inorganic solid, halogenated atoms of a metal chosen from the group consisting of groups IVa, Va and VIa, in which the resulting surface structures are relatively uniform in that the predominant proportion of said halogenated metal atoms each has the same number of halogen atoms attached thereto. Such catalyst components are very useful because such catalyst components when used in conjunction with suitable organometallic compounds to polymerize the monomers of the present invention are characterized by relatively high specificity in that they tend to produce unusually homogeneous polyemers, that is polymers having exceptionally high crystallinity, narrow range of molecular weight, etc.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polyolefins.

Also, the polymers produced by the process of the present invention, especially the polymers having high specific viscosities can be blended with the lower molecular weight polyethylenes to impart stiffness or other desired properties thereto. The solid resinous products produced by the process of the present invention can, likewise, be blended in any desired proportions with hydrocarbon oils, waxes, high bolecular weight polybutylenes, and with other organic materials. Small proportions between about 0.01 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, can be employed in small proportions to substantially increase the viscosity of fluent liquid hydrocarbon oils and as gelling agents for such oils.

The polymers produced by the present process can also be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be crosslinked to effect increases in softening temperature, etc.

Obviously many changes may be made in the above described examples and procedure without departing from the scope of the invention. For example, although only transition metal chlorides, bromides, and iodides were mentioned in the above examples, transition metal fluorides are also suitable for the purposes of the present invention. For example, titanium tetrafluoride is entirely suitable.

Also, pyrogenically coformed, or coprecipitated metal oxides, or metal oxides coformed with, or mixed with, other compounds are suitable for the purposes of the present invention. It is pointed out that it is intended and it should be understood that for the purposes of the present specification and the claims appended thereto, the term, metal oxide, includes silica.

Accordingly, it is intended that the above disclosure be regarded as illustrative and as in no way limiting the scope of the invention.

What we claim is:

1. A proccess for polymerizing a substance chosen from the group consisting of a mono-olefin, mixtures of mono-olefins, a di-olefin, mixtures of di-olefins, and mixtures thereof which comprises contacting said substance at temperatures between about $-25°$ C. and about $250°$ C. with a catalyst comprising (a) a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va and VIa; O is oxygen; $a$ is a number from 0 to 2; each X is any halogen; $b$ is a number from 1 to 5; and where said structures are chemically linked directly from T to at least one oxygen atom in the surface of said solid, and (b) a compound conforming to the general formula $$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalant hydrocarbon radical and hydrogen; and $y$ is a number from 1 to 4.

2. The process of claim 1 wherein the substance to be polymerized is an α-mono-olefin.

3. The process of claim 1 wherein the substance to be polymerized is ethylene.

4. The process of claim 1 wherein the substance to be polymerized is propylene.

5. The process of claim 1 wherein the substance to be polymerized is butene-1.

6. The process of claim 1 wherein the substance to be polymerized is a di-olefin having a double bond in the alpha position.

7. The process of claim 1 wherein said finely-divided solid is a metal oxide.

8. The process of claim 1 wherein said finely-divided solid is titania.

9. The process of claim 1 wherein said finely-divided solid is silica.

10. The process of claim 1 wherein said finely-divided solid is alumina.

11. The process of claim 1 wherein each X in the formula $$TO_aX_b$$

is chlorine.

12. The process of claim 1 wherein in the formula $$TO_aX_b$$

T is a metal of Group IVa.

13. The process of claim 1 wherein in the formula $$TO_aX_b$$

T is titanium, $a$ is 0, each X is chlorine, and $b$ is 3.

14. The process of claim 1 wherein in the formula $$TO_aX_b$$

T is zirconium, $a$ is 0, and each X is chlorine.

15. The process of claim 1 wherein in the formula $$TO_aX_b$$

T is a metal of Group Va.

16. The process of claim 1 wherein in the formula $$TO_aX_b$$

T is vanadium.

17. The process of claim 1 wherein in the formula $$TO_aX_b$$

T is a metal of Group VIa.

18. The process of claim 1 wherein in the formula $$TO_aX_b$$

T is chromium.

19. The process of claim 1 wherein in the formula $$TO_aX_b$$

$a$ is 0 and $b$ is 4.

20. The process of claim 1 wherein in the formula $$TO_aX_b$$

$a$ is 0 and $b$ is 2.

21. The process of claim 1 wherein in the formula $$MM'_vX_nR_y$$

M is aluminum, $v$ is 0, and each R is any alkyl group.

22. The process of claim 1 wherein in said general formula $$MM'_vX_nR_y$$

M is aluminum, $v$ is 1, $n$ is 0, and each R is any alkyl group.

23. A process for polymerizing a substance chosen from the group consisting of a mono-olefin, mixtures of mono-olefins, a di-olefin, mixtures of di-olefins and mixtures thereof which comprises (a) forming a cocatalyst by reacting while eliminating the hydrogen halide produced at temperatures of from about 0° C. to about 105° C. for periods ranging at a minimum from about 10 hours to about 1 minute, the higher the temperature used, the shorter being said minimum time required, hydroxyl groups on the surface of an inorganic solid which has an average particle diameter of less than about 0.1 micron and at least about $1 \times 10^{-4}$ equivalents per gram of hydroxyl groups on the surface thereof and which is substantially free of free and physically bound water, with a compound conforming to the formula:

$$TO_aX_b$$

wherein T is a metal chosen from the group consisting of the metals of Groups IV$a$, V$a$ and VI$a$; O is oxygen; $a$ is a number from 0 to 2; each X is any halogen; and $b$ is a number from 1 to 6; (b) combining said cocatalyst with a compound conforming to the general formula $$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; and $y$ is a number from 1 to 4; and (c) contacting said substance with the resulting catalyst at temperatures between about −25° C. and about 250° C.

24. The process of claim 23 wherein said compound conforming to the formula $$TO_aX_b$$

is titanium tetrachloride.

25. The process of claim 23 wherein the reaction of part (a) to form said cocatalyst is accomplished in a liquid hydrocarbon medium.

References Cited in the file of this patent

UNITED STATES PATENTS

| | | |
|---|---|---|
| 2,924,628 | Donaldson | Feb. 9, 1960 |
| 2,938,000 | Wanless et al. | May 24, 1960 |
| 2,981,725 | Luft et al. | Apr. 25, 1961 |
| 2,989,516 | Schneider | June 20, 1961 |
| 3,054,754 | Lasky | Sept. 18, 1962 |

FOREIGN PATENTS

| | | |
|---|---|---|
| 592,111 | Italy | July 28, 1959 |
| 823,024 | Great Britain | Nov. 4, 1959 |